(12) United States Patent
Frimor et al.

(10) Patent No.: US 10,352,686 B2
(45) Date of Patent: Jul. 16, 2019

(54) METHOD AND DEVICE FOR CALIBRATING A PROJECTION DEVICE

(75) Inventors: Troels Frimor, Munich (DE); Fritz Vollmer, Munich (DE)

(73) Assignee: Brainlab AG, Munich (DE)

( * ) Notice: Subject to any disclaimer, the term of this patent is extended or adjusted under 35 U.S.C. 154(b) by 37 days.

(21) Appl. No.: 14/360,981

(22) PCT Filed: Nov. 28, 2011

(86) PCT No.: PCT/EP2011/071182
§ 371 (c)(1),
(2), (4) Date: May 28, 2014

(87) PCT Pub. No.: WO2013/079088
PCT Pub. Date: Jun. 6, 2013

(65) Prior Publication Data
US 2014/0293294 A1    Oct. 2, 2014

(51) Int. Cl.
*G01B 11/00* (2006.01)
*H04N 9/31* (2006.01)

(52) U.S. Cl.
CPC ........... *G01B 11/00* (2013.01); *H04N 9/3194* (2013.01)

(58) Field of Classification Search
CPC ......... G01C 15/004; G09G 2320/0693; G09G 3/002; H04N 9/3194; G01B 11/03;
(Continued)

(56) References Cited

U.S. PATENT DOCUMENTS 4,684,996 A    8/1987    Baumeister
5,272,344 A *  12/1993   Williams ............... A61B 6/037
                                              250/252.1

(Continued)

FOREIGN PATENT DOCUMENTS

JP    2010 204759    9/2010
WO    2006/110141    10/2006

OTHER PUBLICATIONS

International Search Report for International Application No. PCT/EP2011/071182 dated Aug. 13, 2012.

*Primary Examiner* — Tri T Ton
*Assistant Examiner* — Rufus L Phillips
(74) *Attorney, Agent, or Firm* — Tucker Ellis LLP

(57) ABSTRACT

The present invention relates to a method for calibrating a projection device, in particular a hand-held projection device, in a navigational environment for medical purposes, comprising the steps of:
providing a detection device (1) configured to detect light emitted by the projection device (2);
determining the spatial position of the detection device (1);
projecting a known projection (3), comprising an area (4) configured to stimulate the detection device (1), towards the detection device (1) by means of the projection device (2);
determining the position of the projection device (2), particularly in relation to the detection device (1) when the area (4) stimulates the detection device (1).
The present invention also relates to a calibration device (11) for automatically calibrating a projection device (2), said calibration device (11) comprising a reference array (7) and a detection device (1) which is coupled to the reference array (7), in particular in a predetermined position, wherein the detection device (1) is configured to detect light, and to a self-calibrating projection device system comprising the calibration device (11) and a projection device (2) which is configured to generate a known projection (3) comprising an area (4) which is configured to stimulate a detection device (1) of the calibration device (11).

13 Claims, 1 Drawing Sheet

(58) Field of Classification Search
CPC ........ G03B 21/2033; A61B 2019/5255; A61B 19/5244; A61B 2019/507; A61B 6/08; A61B 19/50; A61B 5/0064
See application file for complete search history.

(56) References Cited

U.S. PATENT DOCUMENTS

| | | | |
|---|---|---|---|
| 5,671,053 A | 9/1997 | Wigg et al. | |
| 5,803,570 A * | 9/1998 | Chen | H04N 9/3185 348/745 |
| 6,239,424 B1 | 5/2001 | Kuo | |
| 6,456,339 B1 * | 9/2002 | Surati | G03B 37/04 348/744 |
| 6,618,076 B1 | 9/2003 | Sukthankar et al. | |
| 7,130,693 B1 * | 10/2006 | Montalbo | A61N 1/0543 607/54 |
| 7,137,707 B2 * | 11/2006 | Beardsley | G03B 21/14 348/746 |
| 7,472,576 B1 * | 1/2009 | Moeck | B82Y 35/00 29/592 |
| 7,948,448 B2 * | 5/2011 | Hutchinson | G06F 3/04845 345/1.1 |
| 2002/0172328 A1 * | 11/2002 | Dekel | A61B 6/12 378/205 |
| 2005/0159759 A1 | 7/2005 | Harbaugh et al. | |
| 2008/0192017 A1 * | 8/2008 | Hildebrandt | G06F 3/0418 345/173 |
| 2008/0275339 A1 * | 11/2008 | Thiemann | A61B 8/0833 600/437 |
| 2010/0165116 A1 | 7/2010 | Hsieh et al. | |
| 2010/0185100 A1 * | 7/2010 | Urban | A61B 5/0059 600/475 |
| 2013/0033700 A1 * | 2/2013 | Hallil | G01B 11/00 356/72 |

* cited by examiner

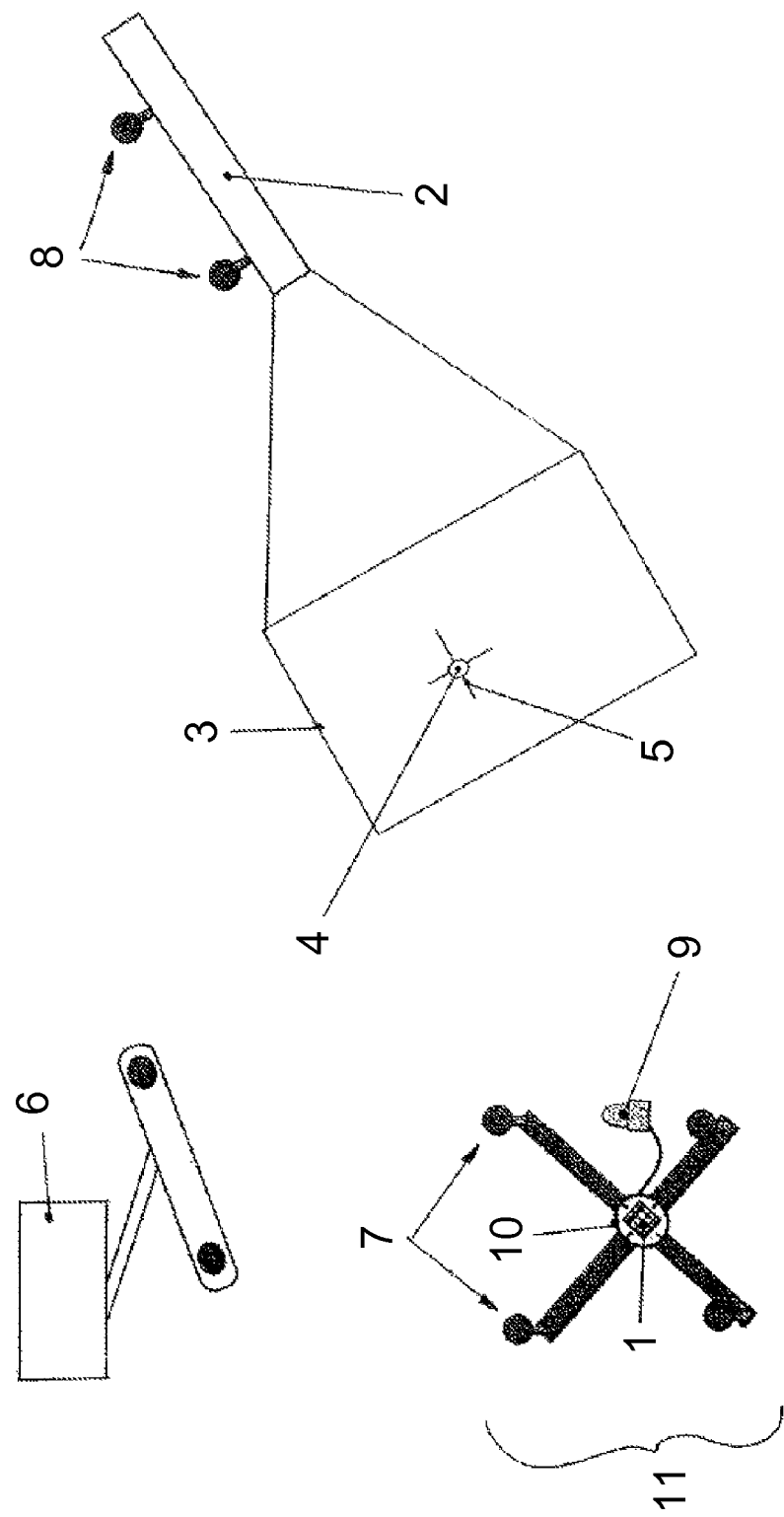

METHOD AND DEVICE FOR CALIBRATING A PROJECTION DEVICE

RELATED APPLICATION DATA

This application is a national phase application of International Application No. PCT/EP2011/071182 filed Nov. 28, 2011 and published in the English language.

The present invention relates to a method for calibrating a projection device, in particular a hand-held projection device, in a navigational environment for medical procedures, and to a calibration device for automatically calibrating a projection device. The present invention also relates to a self-calibrating projection device system comprising such a calibration device and a projection device.

In order to use a projection device in a navigational environment for medical procedures, the projection device must be calibrated, i.e. the image properties of the projected view must be calibrated with respect to the projection device itself and a tracker fixed to the projector. If the projection device is a laser projection device such a calibration enables every projection line starting from the projector and passing along the optical pathway to be known in the reference frame of the medical navigation system.

Standard calibration methods are for example based on detecting a known pattern such as a checked pattern using a calibrated camera which is in a fixed position with respect to the projector.

One typical method using the projector alone, without an integrated camera, involves detecting 2D-3D point pairs. When the spatial position of a projection device is known and a 2D point at a known position in the video image of the projection device reflects onto a known or tracked surface, the spatial coordinates of the point are also known. Acquiring enough 2D-3D point pairs allows the image properties to be calibrated by solving a linear equation. The more point pairs are acquired, the more accurate the calibration is.

Another method for detecting point pairs is to project a rectangle having known edges in the image onto a tracked plane which has defined rectangles drawn on it.

Other patterns can also be used. Manually adjusting the projection to the drawn rectangle allows several points to be acquired simultaneously. Repeating this process with different rectangles from different positions ultimately allows the image properties to be calibrated.

Another method for calibrating image properties is to detect single projections comprising predefined points from different directions. Single points are displayed in the projection, and the user aligns this point with a point having known co-ordinates and so acquires 2D-3D point pairs by pressing a button or the like. However, acquiring 2D-3D point pairs by pressing a button or the like is difficult if positioning is performed "free hand", because correct acquisition depends on triggering at the correct alignment. Any natural tremble of the hand when pressing the acquisition button may therefore lead to inaccurate results. Moreover, when aligning by hand, holding a position while triggering the acquisition by pressing a button or foot switch is cumbersome and time-consuming. Triggering the acquisition by pressing a button on the projector itself could impair the result even more, because the force involved in pressing the button could alter the direction of the projector during the procedure itself.

It is an object of the present invention to provide a calibration method and corresponding calibration device for a projection device, in particular for a hand-held projection device, which do not exhibit the above-mentioned drawbacks.

The drawbacks of the prior art are overcome by the subject-matter claimed in the independent claims, wherein dependent claims define preferred embodiments of the present invention.

The method in accordance with the invention for calibrating a projection device comprises the steps of:
- providing a detection device configured to detect light emitted by the projection device;
- determining the position of the detection device;
- projecting a known projection, comprising an area configured to stimulate the detection device, towards the detection device by means of the projection device;
- determining the position of the projection device, particularly in relation to the detection device, when the area stimulates the detection device.

The term "position" as used in this document encompasses the meanings of "location" and/or "orientation" in at least two dimensions. By this definition, a 2D position of an object for example comprises at least one of the location and orientation of said object in a two-dimensional plane. Similarly, the spatial (3D) position of an object comprises at least one of the spatial location and the spatial orientation of said object.

In other words, the user aims to align an area of a projection generated by the projection device with a detection device, wherein the position of the detection device and the position of the area within the projection are known. If the area hits the detection device, the detection device is stimulated and a triggering signal can be sent. If the position of the projection device is determined for several different spatial positions of the projection device, preferably for at least three or more different spatial positions, the projection device can be calibrated, i.e. image properties of the projection device can be calibrated with respect to the projector itself.

Since no button or foot switch has to be pressed by the user in order to acquire the 2D-3D point pairs, user interaction is reduced and the accuracy of the calibration is increased.

In accordance with one preferred embodiment of the present invention, the area in the projected image is a light spot. The smaller the dimensions of the area, the more accurate the calibration. However, since the light intensity also decreases as the dimensions of the area decrease, an area which is too small might impair the reliability of the calibration method. A compromise therefore has to be found between accuracy and reliability.

Since it is difficult for a user to recognise a small area in the projection, the projection can also comprise geometric figures, in particular a geometric pattern, which is/are configured to serve as a positioning aid and in particular has a different wavelength and/or intensity than the area in the projection.

If such a positioning aid is provided, it is not necessary for the area to be visible to the human eye, since the user can align the area with the detection device with the aid of the visible geometric figure(s) and the area itself only has to be detected by the detection device. It is therefore even possible to provide an area which is for example characterised by infrared light. Geometric figures or geometric patterns in the form of a grid or target are preferred as a positioning aid.

In accordance with another preferred embodiment of the present invention, the position of the detection device and/or the projection device is determined by means of a tracking system which detects the position of tracking references which are coupled to the detection device and/or the projection device. Since the use of tracking systems together with navigation systems is quite common in modern medical procedures, an existing tracking system can be used to determine the position of the detection device and the projection device using common tracking markers which are attached to the detection device and the projection device.

In accordance with another preferred embodiment of the present invention, the position of the projection device is determined automatically by means of the detection device sending a signal when the area of the projection stimulates the detection device. In other words, the invention allows the 2D-3D point pairs to be acquired fully automatically, without any user intervention and in particular without the user having to physically press a button or foot switch.

In accordance with another preferred embodiment of the present invention, a photodiode is provided as a detection device, although any device suitable for detecting light emitted by the projection device can be used in accordance with the present invention.

Transmitting means can also be provided which are configured to transmit a signal from the detection device to a tracking system which indicates that the detection device has been stimulated. Such transmitting means can for example be a cable connection or wireless connection between the detection device and a tracking and/or navigation system.

A projection screen can also be provided in the vicinity of the detection device, in particular around the detection device. Such a screen helps the user to align the area in the projection with a detection device, since the area and any geometric figures serving as a positioning aid can be seen on the projection screen, thereby indicating to the user the position of the area which is to be aligned with the detection device.

In accordance with another preferred embodiment which serves to increase the overall accuracy of the projector calibration, any number of point pairs can be acquired at different distances and/or orientations of the projection device relative to the detection device. The step of determining the position of the projection device is thus performed several times, preferably at least three times, wherein the position of the projection device is changed between at least two determination steps, preferably between at least three determination steps. The position of the area within the projection can also be changed between at least two determination steps. It is possible that, after each, some or predetermined steps of determining the position of the detection device, a reference projection is projected by means of the projection device, which can be compared with a predetermined pattern on a projection screen which allows to determine a defective calibration as well as the progression of the projection device calibration, so that the calibration could be stopped after no significant deviations between the projection and the predetermined pattern can be recognized by a person or a camera device. However, if the calibration of the projection device is not satisfying yet, the position of the detection device could be determined for one ore more further 2D-3D point pairs in order to further improve the calibration of the projection device.

Another aspect of the present invention relates to a calibration device for automatically calibrating a projection device, said calibration device comprising a reference array and a detection device which is coupled to the reference array, in particular in a predetermined position, wherein the detection device is configured to detect light.

In other words, the detection device is fixed to the reference array at a known position, such that the spatial position of the detection device can be determined by determining the position and geometric arrangement of the reference array by means of a tracking system.

The calibration device can also comprise means situated between the detection device and the environment for restricting the light which reaches the detection device to one or more predefined wavelengths. Such means in particular comprise at least one optical filter. Providing such a filter increases the resistance of the calibration device to interference caused by environmental light.

As an alternative to or in addition to the means for restricting the light which reaches the detection device, means for restricting the direction of the light which reaches the detection device can be provided between the detection device and the environment. Preferably, at least one optical lens and/or at least one collimator is/are provided in front of the detection device. Providing such directional restricting means also helps to increase the resistance of the calibration device to interference caused by environmental light.

In accordance with another preferred embodiment of the present invention, the calibration device can comprise means for transmitting a signal which indicates that the detection device has been stimulated. Such means can in particular be a cable connection or wireless connection to a tracking and/or navigation system, specifically an LED which emits infrared light or a fluorescent material on the detection device. Instead of a cable connection or a wireless connection, such as for example a radio link, between the detection device and a tracking and/or navigation system, an LED—in particular, an infrared LED—can be provided which emits light when the detection device, in particular a photodiode device, is stimulated by the area of the projection, wherein this light can be detected by cameras of a tracking and/or navigation system.

Another way of generating a signal which indicates that the detection device has been stimulated is to provide a detection device which comprises a fluorescent material. If the area of the projection hits the fluorescent material, the latter emits light—in particular, infrared light—which can also be detected by cameras of a tracking and/or navigation system but differs from the visible light emitted by the projection device.

Providing a light-emitting device such as an LED or fluorescent material means that said LED or fluorescent material can be directly tracked by means of cameras of a tracking and/or navigation system, without the need for common tracking markers. In other words, such a light-emitting device—in particular an infrared light-emitting device—acts as a reference array, which is required in order to determine at least the position of the detection device.

Another aspect of the present invention relates to a self-calibrating projection device system comprising a calibration device as described in this document and a projection device which is configured to generate a known projection comprising an area which is configured to stimulate a detection device of the calibration device.

In the following, a preferred embodiment of the present invention will be described with the aid of appended FIG. 1. The present invention can comprise any of the features described in this document, individually or in any expedient combination.

FIG. 1 shows a self-calibrating projection device system comprising a calibration device 11 and a projection device 2 to be calibrated.

The calibration device 11 comprises a reference array with four tracking markers 7 which can be tracked by one or more cameras of a tracking system 6. A detection device 1 comprising a photodiode (not shown) is provided centrally with respect to the tracking markers 7 and is rigidly fixed to the reference array. The spatial position of the detection device 1 can thus be determined by means of the tracking system 6. The calibration device 11 also comprises a projection screen 10 which is arranged around the detection device 1 so as to help a user to align an area of a projection with the detection device 1.

The calibration device 11 also comprises an LED 9 which is connected to the detection device 1 and emits infrared light when the photodiode of the detection device 1 is stimulated. The infrared light emitted by the LED 9 is detected by cameras of the tracking system 6, such that a trigger signal is sent for calibrating the projection device 2.

The self-calibrating projection device system also comprises a freely movable hand-held projection device 2 which comprises three tracking markers 8 and projects a projection 3. At a predetermined position within the projection 3, there is a point-shaped area 4 which exhibits an increased light intensity as compared to the rest of the projection 3. A guiding aid 5, in the form of crosshairs in the embodiment shown in FIG. 1, is also provided which can be seen by the user who is holding the projection device 2, especially when it is projected onto the projection screen 10. The guiding aid 5 can exhibit a lower light intensity than the point-shaped area 4 and/or a different colour to the point-shaped area 4.

In order to calibrate the projection device 2, the user aims to align the point-shaped area 4 with the detection device 1 with the aid of the guiding aid 5 and the projection screen 10 which has geometric figures drawn on it which correspond to the guiding aid 5.

When the area 4 hits the detection device 1, the photodiode is stimulated by the increased light intensity of the point-shaped area 4 and sends a signal to the light-emitting diode 9 which in turn emits infrared light. This infrared light can be detected by the tracking system 6 and interpreted as a trigger signal for acquiring a 2D-3D point pair needed for calibrating the projection device 2. The user then moves the projection device 2 to another position and again aims to align the area 4 with the detection device 1.

Once at least three 2D-3D point pairs have been acquired, the projection device 2 is spatially calibrated and can be used in a navigational environment for medical procedures.

It is to be noted that the more 2D-3D point pairs are acquired for calibration, the higher the accuracy of the calibration. The position of the point-shaped area 4 together with the guiding aid 5 within the projection 3 can also be changed between at least two 2D-3D point pairs acquired in order to ensure an accurate calibration of image properties across the whole projection area.

The invention claimed is:

1. A method for calibrating a projector in a navigational environment for medical purposes comprising:
   providing a projector having a first tracking marker attached to the projector, the first tracking marker being adapted to be optically recognized and spatially tracked in a reference frame of a navigation system by a tracking system of the navigation system during a given period of time, the tracking system being adapted to optically recognize and spatially track the first tracking marker and a second tracking marker in the reference system of the navigation system during the given period of time;
   providing a light sensitive detection device, having the second tracking marker attached to the light sensitive detection device, the second tracking marker being adapted to be optically recognized and spatially tracked in the reference frame of the navigation system by the tracking system during the given period of time, and the light sensitive detection device being adapted to send a triggering signal when being hit by light emitted by the projector, the light sensitive detection device comprising a light sensitive transducer;
   using the projector to project an image comprising an area at a predefined location within the image towards the light sensitive detection device, the area being adapted to cause the light sensitive detection device to send the triggering signal;
   using the tracking system to track spatial positions of the first tracking marker and the second tracking marker to automatically determine the relative spatial position of the projector and the light sensitive detection device when the light sensitive detection device emits the triggering signal,
   wherein the automatic determination of the relative spatial position of the projector and the light sensitive detection device is performed several times, and
   wherein at least one of a spatial position of the projector and the predefined location of the area within the image is changed between each automatic determination of the relative spatial position of the projector and the light sensitive detection device; and
   using the navigation system to determine, based on the determined relative spatial positions of the projector and the light sensitive detection device, which were determined several times, and on the known predefined location of the area within the image, a spatial relationship between the image projected by the projector and the first tracking marker attached to the projector.

2. The method according to claim 1, wherein the area is a light spot.

3. The method according to claim 1, wherein the image projected by the projector further comprises geometric figures configured to serve as a positioning aid and having a different wavelength and/or intensity than the area.

4. The method according to claim 1, wherein the light sensitive transducer is a photodiode.

5. The method according to claim 1, wherein transmitting means are provided that are configured to transmit the triggering signal from the light sensitive detection device to the tracking system indicating that the light sensitive detection device has been stimulated.

6. The method according to claim 1, wherein a projection screen is provided around the light sensitive detection device.

7. The method according to claim 1, wherein the automatically determining the relative spatial position of the projector and the light sensitive detection device is performed at least three times,
   wherein the relative position of the projector and the light sensitive detection device and/or the predefined location of the area within the image is changed between each automatic determination of the relative spatial position of the projector and the light sensitive detection device, and
   wherein after each automatic determination of the relative spatial position of the projector and the light sensitive detection device, a reference projection is projected and compared to a predefined pattern on a projection screen so as to allow determining progression of the projector calibration.

8. A self-calibrating projector system comprising:
a projector having a first tracking marker attached to the projector, the first tracking marker being adapted to be optically recognized and spatially tracked in a reference frame of a navigation system by a tracking system of the navigation system during a given period of time, the tracking system being adapted to optically recognize and spatially track the first tracking marker and a second tracking marker in the reference system of the navigation system during the given period of time, the projector being adapted to project an image comprising an area at a predefined location within the image towards a light sensitive detection device, the area being adapted to cause a light sensitive detection device to send a triggering signal;
the light sensitive detection device having the second tracking marker attached to the light sensitive detection device, the second tracking marker being adapted to be optically recognized and spatially tracked in the reference frame of the navigation system by the tracking system during the given period of time, the light sensitive detection device being adapted to send the triggering signal when being hit by light emitted by the projector, the light sensitive detection device comprising a light sensitive transducer;
a tracking system that is adapted to track spatial positions of the first tracking marker and the second tracking marker to automatically determine the relative spatial position of the projector and the light sensitive detection device when the light sensitive detection device emits the triggering signal,
wherein the tracking system is further adapted to perform the step of automatically determining the relative spatial position of the projector and the light sensitive device is performed several times, and
wherein at least one of a spatial position of the projector and the predefined location of the area within the image is changed between each automatic determination of the relative spatial position of the projector and the light sensitive device; and
the navigation system that is adapted to determine, based on the determined relative spatial positions of the projector and the light sensitive detection device, which were determined several times, and on the known predefined location of the area within the image, a spatial relationship between the image projected by the projector and the first tracking marker attached to the projector.

9. The calibration device according to claim 8, further comprising means situated between the light sensitive detection device and the environment for restricting the light which reaches the light sensitive detection device to one or more predefined wavelengths, said means comprising at least one optical filter.

10. The calibration device according to claim 8, further comprising a means situated between the light sensitive detection device and the environment for restricting the direction of the light which reaches the light sensitive detection device to predefined directions, said means comprising at least one optical lens and/or at least one collimator.

11. The calibration device according to claim 8 further comprising means for transmitting the triggering signal which indicates that the light sensitive detection device has been stimulated, said means comprising a cable connection or wireless connection to the medical tracking system and/or a medical navigation system.

12. The self-calibrating projector system according to claim 8 wherein the tracking system is further adapted to automatically determine
a position of the projector upon emittance of the triggering signal.

13. The calibration device according to claim 11, wherein the means for transmitting the triggering signal is a light-emitting diode (LED) that emits infrared light or a fluorescent material on the light sensitive detection device.

\* \* \* \* \*